UNITED STATES PATENT OFFICE 2,257,800

ALLOY-SKELETON CATALYST

Benjamin W. Howk, Wilmington, Del., assignor to E. I. du Pont de Nemours & Company, Wilmington, Del., a corporation of Delaware No Drawing. Application April 12, 1940, Serial No. 329,299

7 Claims. (Cl. 252—234)

This invention relates to new catalyst compositions and, more particularly, it relates to a process for preparing cobalt hydrogenation-dehydrogenation catalysts. More specifically, this invention relates to the preparation of finely divided, super-active, easily suspensible cobalt catalysts and their use in the hydrogenation of adiponitrile.

The increasingly widespread use of catalytic hydrogenation processes by the chemical industry has been accompanied by the development of many different types of hydrogenation catalysts, some of which are fairly specific in their applications, while others find a more general use in the hydrogenation of various kinds of compounds containing unsaturated groups capable of hydrogenation. Among the more familiar catalysts in the latter classification, finely divided metals of group VIII of the periodic table are perhaps the most widely used and the most important. Generally speaking, the commercial utility of the platinum sub-group metals including platinum, palladium, and rhodium has been limited by their high cost. On the other hand, metals of the ferrous sub-group comprising iron, cobalt, and nickel have been shown to possess high activity as hydrogenation catalysts, and many successful large-scale hydrogenation processes are dependent on their use. Of these, nickel has been found to be the most important for commercial use and considerable work has been done in developing highly effective nickel hydrogenation catalysts. Such catalysts have been adopted for the hardening of vegetable oils, saturation of aromatic compounds, conversion of aromatic nitro compounds to amines, and the reduction of aldehydes and ketones to alcohols.

In connection with many of these processes, one of the important large-scale problems has been to provide finely divided catalysts possessing high activity and, in addition, the ability to remain suspended in the hydrogenation mixture with a minimum of agitation. Naturally, the method of preparing a finely divided hydrogenation catalyst has an important bearing on its suspensibility, and it often happens that the use of a desirable catalyst of high activity in a particular hydrogenation reaction is precluded by its lack of suspensibility in liquids.

In commercial practice, nickel prepared by the Raney method has been found to be one of the more satisfactory catalysts for hydrogenation reactions in general. In this method of preparing a nickel catalyst, nickel is alloyed with aluminum, the alloy reduced to a fine powder, and the resulting powder leached with caustic alkali solution to dissolve the aluminum. The resulting metallic nickel powder is exceptionally active as a hydrogenation catalyst. Experience has taught that the use of alloys of 50% nickel and 50% aluminum give the most desirable type catalysts. Those skilled in the art are, however, familiar with the fact that such a catalyst is comparatively heavy and tends to settle out of suspension quickly, and that the resulting sludge or cake is difficult to re-suspend without particularly effective means of agitation. These properties are also obviously disadvantageous whenever charging the catalyst to the hydrogenating vessel involves pumping a slurry through pipelines from a separate mixing vessel. A common expedient to avoid these disadvantages has been to employ finely divided metallic nickel deposited on light, porous supports or carriers such as alumina, pumice, kieselguhr, or activated carbon. However, in many cases such catalysts are of inferior activity, and have the added disadvantage that the support often has an unfavorable effect on specific hydrogenation reactions.

More recently cobalt has become of interest commercially since active cobalt catalysts are particularly valuable in the hydrogenation of aliphatic dinitriles to aliphatic diamines. Inasmuch as cobalt has been suggested as a substitute for nickel, cobalt catalysts have likewise been made in the manner of the alloy-skeleton nickel catalysts. Following the teachings of the prior art, a 50–50 alloy of cobalt and aluminum was prepared, powdered, and extracted with caustic alkali solution. This catalyst, while very active, was found to lack suspensibility. Since the suspensibility of nickel catalysts is not improved either by variations in the method of preparing the catalyst or by variations in the percentage of nickel in the alloy, it is clear that the prior art provides no guide to the solution of the problem of producing active, easily suspensible metallic hydrogenation catalysts. It is equally true that the provision of easily suspensible cobalt catalysts having, in addition, high activity and selectivity is an important and pressing problem if the full advantages of cobalt catalysts for certain hydrogenation reactions are to be realized in large-scale operations. An important contribution to the art of catalyst manufacture is accordingly provided by the present invention, which comprises the discovery of a process for making active elementary cobalt catalysts that are easily suspensible in liquids without the aid of a carrier or support.

Accordingly, it is an object of this invention to produce an easily suspensible metallic cobalt catalyst. Another object is to provide a process for preparing a cobalt catalyst that is highly active and will remain suspended in the reaction medium by simple agitation such as provided by the passage of a gas through the reactants. Another object is to produce a highly active metallic cobalt catalyst that will not settle from solution and cake. Still another object is to produce a finely divided, metallic, unsupported cobalt catalyst that is easily suspensible. Another object is to prepare a cobalt catalyst that will be usable in gas-agitated, liquid-phase hydrogenation equipment. Another object is to produce a cobalt catalyst which will lack the tendency to form difficultly dispersible sludges in pipelines or reaction vessels. Another object is to provide a cobalt catalyst that is more active than the usual type cobalt catalyst. Other objects will be apparent from the following description of the invention.

These objects are accomplished by the following invention which comprises alloying 25 to 35 parts by weight of cobalt with 75 to 65 parts by weight of pure aluminum, reducing the alloy to a fine powder, and treating the powder with an excess of caustic alkali solution to dissolve the aluminum.

A cobalt aluminum alloy containing from 25 to 35% by weight of cobalt was prepared according to a conventional procedure and ground to fine powder which passed through a 325 mesh screen. The alloy was treated by the following procedure: One part by weight of alloy powder was suspended in 4 to 4½ parts by weight of boiling water. To this suspension was added slowly with stirring about 3 parts by weight of 40% caustic soda solution. After a small amount of alkali had been added, a vigorous exothermic reaction occurred which continued without further addition of alkali for 30 to 50 minutes. Apparently, the sodium hydroxide catalyzed the reaction of water with aluminum to produce aluminum hydroxide, which separated as a gray sludge during this stage of the reaction. Thereafter, the caustic solution was added at a more rapid rate; one to two hours was usually sufficient. During this addition the alumina gradually redissolved leaving finely divided metallic cobalt suspended in the solution. The latter was digested for an additional 4 hours to insure complete solution of the alumina and finally allowed to settle. The supernatant liquid was decanted and the metallic cobalt sludge washed with cold water by decantation two or three times to remove most of the alkali and dissolved sodium aluminate. Finally, the sludge was again boiled with 3 parts by weight of 40% sodium hydroxide solution for 4 hours. The resulting catalyst was isolated by washing thoroughly with distilled water until free from alkali and finally with 95% alcohol. The catalyst was preferably stored under absolute alcohol. These catalysts are characterized by the following properties, which also serve to distinguish them either from ordinary alloy-skeleton cobalt catalysts prepared from alloys containing 50% cobalt, or from alloy skeleton nickel catalysts made from nickel alloys irrespective of the percentage nickel in the alloy.

1. *Low apparent density.*—The volume occupied by a given weight of easily suspensible cobalt catalyst after settling from an alcohol or water suspension for several days is approximately twice that of an equal weight of standard alloy-skeleton cobalt catalyst.

2. *Uniform particle size.*—This is evidenced by the uniform rate of sedimentation as contrasted with the standard catalysts, which largely tend to agglomerate rapidly in lumps, leaving a cloudy suspension of finer particles.

3. *Ease of re-suspension.*—These catalysts require very little agitation to re-suspend them in liquids after settling. Similarly, suspensions are maintained without difficulty with a minimum of agitation such as might be provided by bubbling a gas through the mixture.

4. *Extremely fine particle size.*—This is evidenced by the jelly-like consistency of the catalyst sludges, which in contrast to ordinary alloy-skeleton catalysts have an apparent viscosity very little greater than that of the liquid medium. Further evidence is provided by the exceptional efficiency of easily suspensible cobalt as a catalyst for the hydrogenation of adiponitrile to hexamethylenediamine. Three to four parts will accomplish the same results as eight to ten parts of regular alloy-skeleton cobalt.

*Example I*

An alloy of cobalt and aluminum was prepared by mixing 70 parts by weight of pure commercial aluminum with 30 parts by weight of cobalt metal and heating with stirring at temperatures above the melting point until a uniform composition was obtained. The alloy was cooled and pulverized in a disc mill to obtain a finely divided powder, preferably finer than 325 mesh. Two hundred twenty-six parts by weight of the 325 mesh powder was suspended in 1000 parts by weight of distilled water and heated to approximately 96° C. A solution comprising 300 parts by weight of sodium hydroxide in 450 parts by weight of water was added to the alloy suspension at a slow rate. After a small amount of the caustic solution had been added, a vigorous reaction occurred with the evolution of hydrogen and the formation of a precipitate of hydrated aluminum oxide mixed with cobalt metal. This reaction was exothermic and the solution continued to boil without further addition of caustic over a period of 30 to 50 minutes. Thereafter, the addition of caustic solution was resumed at a much faster rate, 1 to 1½ hours usually being sufficient to complete the addition. The resulting mixture was boiled for an additional four-hour period while maintaining the volume constant by addition of small amounts of water from time to time. Suspended material was allowed to settle and the supernatant caustic containing liquid decanted. The precipitate was washed by decantation several times to remove most of the caustic solution and dissolved sodium aluminate. Thereafter, 1000 parts of water containing 227 parts of caustic soda were added to the residue and the mixture boiled with stirring for another four-hour period. The resulting finely divided metallic cobalt sludge was washed with water until free from alkali, then with ordinary alcohol and finally with absolute alcohol. The resulting product was suitable for use as a hydrogenating catalyst without further treatment.

The cobalt catalyst prepared as described above differs markedly in properties from either cobalt or nickel catalysts prepared by activation of alloys containing 50% of the hydrogenating metal. For example, this product when suspended in liquids such as alcohol, water, adiponitrile, and the like will remain suspended indefinitely with a minimum of agitation such as might be obtained by passing a stream of gas through the liquid. Similarly, on standing without agitation the finely divided cobalt forms a jelly-like sludge, which can be re-dispersed with a minimum of agitation. This effect is noted even after standing for periods as long as several weeks. The apparent viscosity of the sludge is but little greater than that of the medium.

An experiment showing the superior activity of cobalt catalysts prepared by this process was carried out as follows. One hundred parts of pure adiponitrile, 7.8 parts of cobalt catalyst, and 75 parts of liquid ammonia were charged into a high pressure reaction vessel. The mixture was heated to 120° C. under a hydrogen pressure of about 2000 to 3000 lbs. per sq. in. A rapid reaction, exothermic to 145° C., occurred and the absorption of hydrogen was complete within about 10 to 15 minutes. The reaction vessel was cooled, the product removed, and the catalyst separated by filtration. On distilling the catalyst-free product, there was obtained a 95.9% yield of pure hexamethylenediamine B. P. 104° to 105° C./27 mm., 1.8% of hexamethyleneimine, B. P. 135° to 137° C., and 2.1% of residue.

*Example II*

The activity at low temperatures of the easily suspensible cobalt catalyst referred to in Example I was shown by the following experiment: One hundred parts of pure adiponitrile, 75 parts of liquid ammonia, and 5 parts of easily suspensible cobalt catalyst were charged into a high pressure reaction vessel and subjected to a hydrogen pressure of 2000 to 3000 lbs. per sq. in. The temperature was gradually increased to 75° C. at which temperature hydrogen was absorbed at the rate of approximately 1000 pounds per hour. On reaching 90° C. the rate of hydrogen absorption was very rapid and was complete within a period of 1½ hours. On working up the product according to the procedure outlined in Example I, there was obtained 1.2% of hexamethyleneimine, 96.2% of hexamethylenediamine, and 2.6% of high boiling residue. The yields referred to are molecular yields. This experiment also demonstrates that relatively small amounts of the easily suspensible cobalt catalyst will promote the hydrogenation of adiponitrile at a satisfactory rate and that under these conditions high yields of the desired hexamethylenediamine are obtained.

*Example III*

One hundred parts of pure adiponitrile was charged into an autoclave and hydrogenated in the presence of 5 parts of the cobalt catalyst referred to in Example I at a pressure of 500 lbs. per sq. in. and at a temperature between 50° and 110° C. Under these conditions the absorption of hydrogen was complete within five hours and there was recovered 9.3% of hexamethyleneimine, 82.2% of hexamethylenediamine, and 8.3% of high boiling residue. It will be noted that in this experiment liquid ammonia was omitted from the reaction charge.

*Example IV*

Easily suspensible cobalt catalysts are also adaptable to the partial hydrogenation of adiponitrile to produce epsilon-aminocapronitrile. For example, 100 parts of adiponitrile was hydrogenated in the presence of 3.2 parts of cobalt catalyst and 75 parts of liquid ammonia at 120° C. and a hydrogen pressure of 2500 lbs. per sq. in. until approximately one-half the theoretical amount of hydrogen for the complete saturation of the nitrile groups had been absorbed. There was obtained on working up the product 1.0% of hexamethylenimine, 18.3% of hexamethylenediamine, 42.4% of epsilon-aminocapronitrile, B. P. 134° C./30 mm., and 36.1% of residue comprising unchanged adiponitrile and high-boiling non-distillable products. It will be noted that a very small amount of catalyst must be used so that the reaction can be controlled to yield the half-hydrogenated product.

*Example V*

By way of contrast to the easily suspensible cobalt catalysts, a cobalt catalyst was prepared from an alloy containing 50 parts by weight of cobalt and 50 parts by weight of aluminum by the conventional method of the prior art as follows: Four hundred fifty-four parts by weight of sodium hydroxide was dissolved in 2000 parts by weight of distilled water. To the cold solution was added in small portions 454 parts of the 50–50 cobalt-aluminum alloy powder over a period of 1 to 2 hours. From the time of the first addition a vigorous reaction ensued and the rate of addition of alloy powder was governed by the rate of boiling. Thereafter, the reaction mixture was boiled with stirring for a period of four hours and maintained at constant volume by adding small amounts of water from time to time. Thereafter, the finely divided alloy powder produced was recovered according to the procedure described under Example I. In contrast to the unusual properties of the easily suspensible cobalt catalyst the material obtained by this procedure was heavy, formed a dense, difficultly dispersible cake after settling from liquids, and was comprised of particles that are non-uniform in size. This was shown by the very erratic sedimentation rates noted when a suspension was allowed to settle. The coarser particles came out almost immediately, while finer particles sedimented at vary slower rates as evidenced by the formation of several cloudy layers through the liquid.

The performance of this catalyst in the hydrogenation of adiponitrile was shown as follows: One hundred parts of adiponitrile, 8 to 10 parts of the cobalt catalyst, and 75 parts of liquid ammonia were charged into a high pressure reaction vessel and treated with hydrogen at 120° C. under a pressure of 2500 to 3000 lbs. per sq. in. Under these conditions the absorption of hydrogen proceeded smoothly and was complete within 1½ to 2 hours. On working up the product as described above there was obtained 1.8% hexamethylenimine, 95.5% hexamethylenediamine, and 2.1% of high-boiling residue. It will be noted from this experiment that both the performance of the catalyst and the yield of desired product were the same as those obtained with approximately one-half as much easily suspensible cobalt catalyst. Furthermore, in the first experiment described above, the use of 8% of easily suspensible cobalt catalyst produced an exothermic reaction that was complete in less than 15 minutes.

*Example VI*

A cobalt-aluminum alloy was prepared by fusing 75 parts by weight of aluminum with 25 parts by weight of cobalt. The alloy obtained was characterized by its somewhat malleable properties which were in contrast to those of alloys containing, for example, 30 to 50 parts by weight of cobalt. Obviously, the malleability of this alloy was disadvantageous in reducing it to a finely divided powder by conventional grinding methods. However, by repeated passage through the mill, a substantial percentage of the alloy was reduced to 325 mesh or finer. Activation of this catalyst with sodium hydroxide solution according to the procedure outlined in Example I produced a finely divided cobalt catalyst powder that was for all practical purposes identical with that obtained from 30–70 cobalt-aluminum alloys. Hydrogenation of 100 parts of adiponitrile in the presence of 75 parts of ammonia and 5 parts of this catalyst gave molecular yields of 2.5%, 95.1%, and 2.9% of hexamethylenimine, hexamethylenediamine, and high-boiling residue, respectively.

*Example VII*

A cobalt-aluminum alloy was prepared by melting together 35 parts by weight of cobalt metal and 65 parts by weight of pure aluminum. The alloy obtained was indistinguishable in physical properties from the 50–50 cobalt-aluminum alloy referred to under Example V. No difficulty was encountered in reducing the alloy to a powder finer than 325 mesh in conventional grinding equipment. Activation of this powder by the method described in Example I produced a finely divided, easily suspensible, cobalt catalyst that differed somewhat from that produced from alloys containing 30% or less of cobalt. It had a tendency to separate from suspensions somewhat more rapidly; more effective agitation was required to maintain suspensions in liquids; and after settling from suspension the catalyst sludge produced was a little more difficult to re-suspend. However, this material was classified as an easily suspensible cobalt catalyst since its properties were still in sharp contrast to those of cobalt or nickel catalysts prepared by the conventional prior art method from 50–50 alloys. This catalyst had the characteristic high activity of easily suspensible cobalt catalysts as shown by hydrogenating 100 parts of adiponitrile in the presence of 8 parts by weight of catalyst and 75 parts by weight of liquid ammonia at 120° C. under a hydrogen pressure of 2000 to 3000 lbs. per sq. in. Under these conditions the reaction was complete within 25 minutes, and there was obtained 2.1% hexamethylenimine, 96.2% hexamethylenediamine, and 2.9% of high boiling residue.

Although certain definite alloy concentrations and methods for catalyst activation have been disclosed in the above examples, these factors may be varied somewhat within the scope of the invention. For example, the invention contemplates the preparation of alloy-skeleton cobalt catalysts from alloys containing from about 25% to about 35% by weight of cobalt and corresponding amounts of a metal, such as aluminum, which is readily attacked by caustic alkali solutions. The selection of a particular alloy within this range will be governed largely by the properties of the catalyst desired and by the type of equipment in which it is to be used. Generally speaking, cobalt catalysts prepared from alloys containing less than about 25% of cobalt are impractical and uneconomical owing to the low weight yield of catalyst obtained from a given amount of alloy. Moreover, alloys containing relatively large percentages of caustic alkali-soluble metals are soft and malleable rather than brittle. This adds greatly to mechanical difficulties in grinding the material to the requisite fine powder. On the other hand, catalysts from alloys containing more than about 35% by weight of cobalt are undesirable, since they no longer possess in a marked degree the characteristic properties of the easily suspensible catalysts described herein. These properties are largely governed by the cobalt content of the original alloy, and 35% of cobalt represents the maximum limit above which the catalysts obtained differ but little from ordinary alloy-skeleton catalysts prepared by the preferred methods of the prior art.

The preferred procedure for treating the alloys of this invention is described in the examples. Nevertheless, other procedures can be used as long as sufficient caustic alkali is employed to insure complete removal of all alkali-soluble components of the alloy. A second caustic digestion is particularly beneficial. This invention is not restricted to the use of aluminum as the alkali-soluble metal. Other suitable metals include silicon, zinc, and tin. These metals may be used to replace aluminum, wholly or in part. It is sometimes advantageous to employ various combinations of these metals alloyed with cobalt.

The easily-suspensible, alloy-skeleton, cobalt catalysts as prepared by this invention are pyrophoric in nature. These catalysts may be stabilized by exposure to an oxidizing atmosphere while maintaining the catalyst mass at a temperature below 50° C. The invention is restricted to the preparation of cobalt catalysts, since other hydrogenating metals, such as nickel, fail to give easily suspensible products. This is clearly demonstrated by the following experiment: Two hundred twenty-five parts 30–70 nickel-aluminum alloy ground to 325 mesh was suspended in 1000 parts of boiling distilled water. Three hundred parts of sodium hydroxide dissolved in 400 parts was added during a period of two hours. After treating the suspended material further by the procedure of Example I, there was obtained about 65 parts of finely divided nickel powder. This product was but little different in properties from alloy-skeleton catalysts made from 50–50 nickel-aluminum alloys.

The cobalt hydrogenation catalysts of this invention are particularly valuable for use in gas-agitated, liquid-phase hydrogenation equipment owing to their unique suspensibility and lack of tendency to form difficulty dispersible sludges in pipelines or reaction vessels. Similarly, owing to the extreme fineness of subdivision of these catalysts, they are substantially more effective than ordinary elementary cobalt catalysts. For example, five parts of easily suspensible catalyst will accomplish the same results as ten parts of ordinary cobalt alloy-skeleton or supported catalysts in the hydrogenation of adiponitrile to hexamethylenediamine. All of these factors accordingly combine to minimize catalyst consumption and materials losses and serve to improve the operating efficiency of commercial hydrogenation equipment.

It has been demonstrated that cobalt catalysts give superior results in certain hydrogenation reactions wherein amines are produced. For example, cobalt is better than nickel for converting dinitriles to diamines, and aromatic amines to hydroaromatic amines. Easily suspensible cobalt catalysts can be substituted advantageously for other kinds of cobalt catalysts in these processes. The catalysts of this invention are particularly suitable for use in the hydrogenation of adiponitrile to hexamethylenediamine. This process is conveniently carried out with 5 parts or less of catalyst at temperatures between 50° and 170° C. and hydrogen pressures above 30 atmospheres, preferably in the presence of a molecular excess of ammonia. Easily suspensible cobalt catalysts may also be employed to advantage in many hydrogenation processes wherein the use of catalyst supports such as pumice, kieselguhr, alumina, and activated carbon is undesirable.

By the term "alloy skeleton catalyst" as used herein and in the claims I refer to the class of catalysts which are derived from alloys of a catalytic metal with at least one alkali soluble metal, said catalysts being obtained by grinding said alloys to a fine powder and extracting substantially all of the alkali soluble component, thereby leaving a skeleton of the original alloy.

It is apparent that many widely different embodiments of this invention may be made without departing from the spirit and scope thereof and therefore it is not intended to be limited except as indicated in the appended claims.

I claim:

1. An easily suspensible alloy-skeleton cobalt catalyst obtained by extracting substantially all of the alkali soluble metallic component from a finely ground alloy of cobalt and an alkali soluble metal, said alloy containing 25 to 35% by weight of cobalt.

2. An easily suspensible alloy-skeleton cobalt catalyst obtained by extracting substantially all of the aluminum from the finely ground alloy of cobalt and aluminum, said alloy containing 25 to 35% by weight of cobalt.

3. A process of making an easily suspensible cobalt catalyst which comprises preparing an alloy of cobalt and an alkali soluble metallic component, said alloy containing 25 to 35% by weight of cobalt, grinding said alloy to a fine powder, and extracting the alkali soluble metallic component with a solution of caustic alkali.

4. An easily suspensible pyrophoric alloy-skeleton cobalt catalyst obtained by extracting substantially all of the aluminum from the finely ground alloy of cobalt and aluminum, said alloy containing 25 to 35% by weight of cobalt.

5. The process in accordance with claim 3 characterized in that the alkali soluble metallic component in the alloy is aluminum.

6. The process in accordance with claim 3 characterized in that the caustic alkali solution is an aqueous caustic alkali solution.

7. The process in accordance with claim 3 characterized in that the alloy is a cobalt-aluminum alloy.

BENJAMIN W. HOWK.